United States Patent
Prabhakar et al.

(10) Patent No.: US 10,187,478 B2
(45) Date of Patent: Jan. 22, 2019

(54) DYNAMIC DETECTION OF INACTIVE VIRTUAL PRIVATE NETWORK CLIENTS

(71) Applicant: Aruba Networks, Inc., Sunnyvale, CA (US)

(72) Inventors: Raghunandan Prabhakar, Bangalore (IN); Abhishek Kumar, Bangalore (IN); Sridhar Pasupula Chandrasekaran, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 356 days.

(21) Appl. No.: 14/334,830

(22) Filed: Jul. 18, 2014

(65) Prior Publication Data
US 2016/0021194 A1   Jan. 21, 2016

(51) Int. Cl.
| | |
|---|---|
| G06F 15/177 | (2006.01) |
| H04L 29/08 | (2006.01) |
| H04L 29/06 | (2006.01) |
| H04L 12/26 | (2006.01) |
| H04W 84/12 | (2009.01) |

(52) U.S. Cl.
CPC ........ H04L 67/143 (2013.01); H04L 63/0272 (2013.01); H04L 63/20 (2013.01); H04L 43/10 (2013.01); H04L 63/164 (2013.01); H04W 84/12 (2013.01)

(58) Field of Classification Search
CPC ........ H04L 67/143; H04L 67/10; H04L 43/10
USPC .......................... 709/204, 224, 225; 370/248
See application file for complete search history.

(56) References Cited

U.S. PATENT DOCUMENTS

| | | | | |
|---|---|---|---|---|
| 6,542,476 | B1* | 4/2003 | Elizondo | H04W 76/068 370/278 |
| 8,656,481 | B2* | 2/2014 | Cheng | H04L 63/164 713/151 |
| 8,923,136 | B2* | 12/2014 | Simonsson | H04W 72/085 370/242 |
| 2004/0170158 | A1* | 9/2004 | Man-Hak Tso | H04L 12/5875 370/351 |
| 2007/0173252 | A1* | 7/2007 | Jiang | H04W 8/04 455/432.1 |
| 2010/0329127 | A1* | 12/2010 | Pirozzi | H04L 43/0805 370/242 |
| 2012/0078998 | A1* | 3/2012 | Son | H04L 63/0272 709/203 |

(Continued)

*Primary Examiner* — David R Lazaro
*Assistant Examiner* — Mariegeorges A Henry
(74) *Attorney, Agent, or Firm* — Hewlett Packard Enterprise Patent Department

(57) ABSTRACT

The present disclosure discloses a method and network device for dynamic detection of inactive virtual private network clients. Specifically, a network device receives periodic messages from a first device at a first interval, and determines a timeout value for the first device based at least on the first interval, at which the periodic messages are received from the first device. Subsequent to determining the timeout value, the network device detects that a message has not been received from the first device for a period of time corresponding to the timeout value for the first device. The network device then terminates at least one connection with the first device responsive to determining that no message has been received from the first device for the period of time corresponding to the timeout value for the first device.

20 Claims, 8 Drawing Sheets

(56) References Cited

U.S. PATENT DOCUMENTS

2014/0003354 A1* 1/2014 Ekici .................. H04W 76/028
370/329

* cited by examiner

DYNAMIC DETECTION OF INACTIVE VIRTUAL PRIVATE NETWORK CLIENTS

FIELD

The present disclosure relates to client management in wired/wireless local area networks. In particular, the present disclosure relates to a method and/or network device for providing dynamic detection of inactive virtual private network clients in a network.

BACKGROUND

A Virtual Private Network (VPN) Concentrator typically creates a virtual private network by creating a secure connection across a network that users see as a private connection. The secure connection is often called a tunnel. The VPN Concentrator uses tunneling protocols to negotiate security parameters, create and manage tunnels, encapsulate packets, transmit or receive them through the tunnel, and unencapsulate them. The VPN Concentrator functions as a bidirectional tunnel endpoint. It can receive plain packets, encapsulate them, and send them to the other end of the tunnel where they are unencapsulated and sent to their final destination. It can also receive encapsulated packets, unencapsulate them, and send them to their final destination.

The VPN Concentrator performs the following functions: establishing tunnels; negotiating tunnel parameters; authenticating users; assigning user addresses; encrypting and decrypting data; managing security keys; managing data transfer across the tunnel; managing data transfer inbound and outbound as a tunnel endpoint or router.

When a network controller device serves in a role of VPN concentrator, the network controller device may terminate a huge number of IPSec tunnels, maintain a huge number of Security Policy Databases (SPDs) in datapath, and hold crucial hardware resources, such as a pool of Diffie Hellman (DH) values, till the lifetime of IPSec Security Associations (SAs). Therefore, detecting inactive Internet Key Exchange (IKE) peers at an early stage would allow many resources to be freed and applied to a new set of IKE peers, thereby improving network resource utilization. Nevertheless, the lifetime of IPSec SAs is typically a static configuration. Thus, network controller devices conventionally detect inactivity of client devices or access points that are connected to IPSec tunnels based on a fixed timeout value, which precludes early detection of inactive IKE peers.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1A:
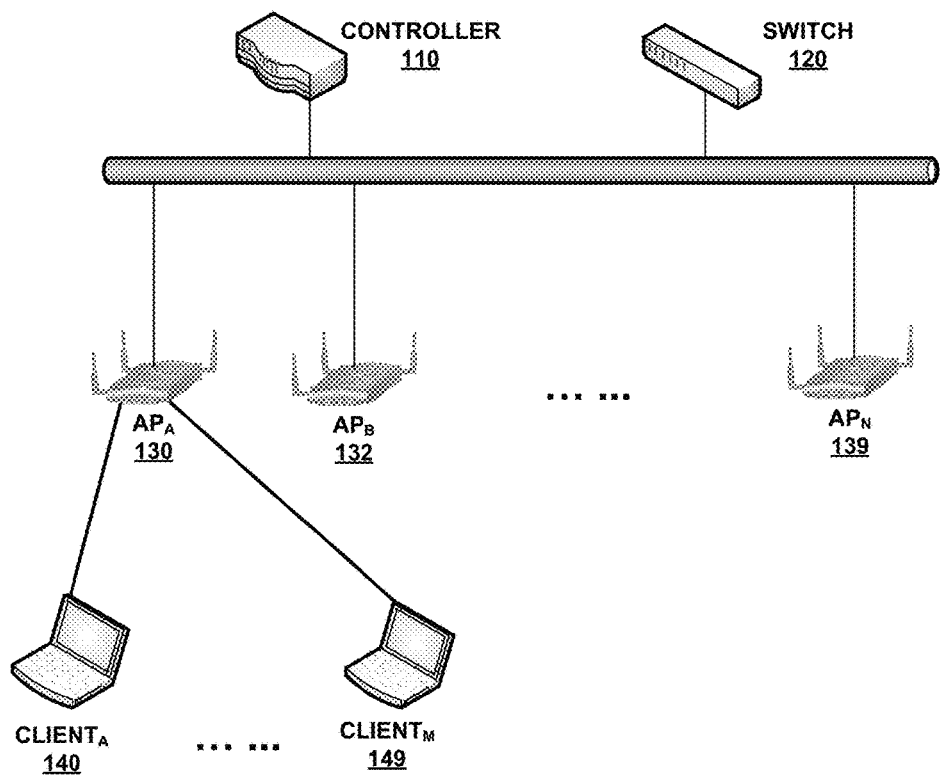
FIGS. 1A-1B show exemplary network environments according to embodiments of the present disclosure.

In the following description, several specific details are presented to provide a thorough understanding. While the context of the disclosure is directed to device discovery and location approximation in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to client management in wireless local area networks. In particular, the present disclosure relates to a method and/or network device for providing dynamic detection of inactive virtual private network clients in a network. Rather than using a static timeout value to detect inactive clients, a disclosed network device can dynamically determine a timeout value based on how a particular client device communicates in the network, such that clients that communicate more frequently on the network will correspond to shorter timeout values.

With the solution provided herein, the disclosed network device receives periodic messages from a first device at a first interval, and determines a timeout value for the first device based at least on the first interval, at which the periodic messages are received from the first device. Subsequent to determining the timeout value, the disclosed network device detects that a message has not been received from the first device for a period of time corresponding to the timeout value for the first device. The disclosed network device then terminates at least one connection with the first device responsive to determining that no message has been received from the first device for the period of time corresponding to the timeout value for the first device.

According to some embodiments of the present disclosure, the disclosed network device determines a first period of time between (a) transmission of a last-sent message to a first device and (b) receipt of a first message of a first set of periodic messages from the first device. Furthermore, the disclosed network device determines a timeout value for the first device based at least on the first period of time. Subsequent to determining the timeout value, the disclosed network device detects that a message has not been received from the first device for a period of time corresponding to the timeout value for the first device. Then, the disclosed network device terminates at least one connection with the first device responsive to determining that no message has been received from the first device for the period of time corresponding to the timeout value for the first device.

Network Environment

FIG. 1A shows an exemplary network environment according to embodiments of the present disclosure. Specifically, FIG. 1A illustrates a campus network that includes at least a switch 120, a network controller 110, and a plurality of network devices, such as $AP_A$ 130, $AP_B$ 132, . . . , $AP_N$ 139. Furthermore, multiple client devices are associated with each access point. For example, Client$_A$ 140 to Client$_M$ 149 are associated with AP$_A$ 130 in the example illustrated in FIG. 1A.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Switch 120 generally refers to a computer networking device that is used to connect devices together on a computer network by performing a form of packet switching. A switch can send a message only to the port connected to the device that needs or requests the message. A switch is a multi-port network bridge that processes and forwards data at the data link layer (layer-2) of the OSI (Open Systems Interconnection) model. A switch may also have additional features, including the ability to route packets, e.g., as layer-3 or multilayer switches.

Access points, such as AP$_A$ 110, AP$_B$ 112, ..., AP$_N$ 119, generally refer to a wireless network device that allows wireless client devices to connect to a wired network using IEEE 802.11 or related standards. The APs usually connect to a router via a wired network, but can also be an integral component of the router itself.

Each access point serves one or more client devices. Also, each client device and/or access point may connect to another network device and/or client device via a secure communication channel, such as an IPSec tunnel, which passes through a centralized network controller. For example, in FIG. 1A, Client$_A$ 140 to Client$_M$ 149 are connected to AP$_A$ 130. Each of the client devices may establish an IPSec tunnel to another client or server in the network, whereas the IPSec tunnel passes through controller 110 in FIG. 1A.

Figure 1B:
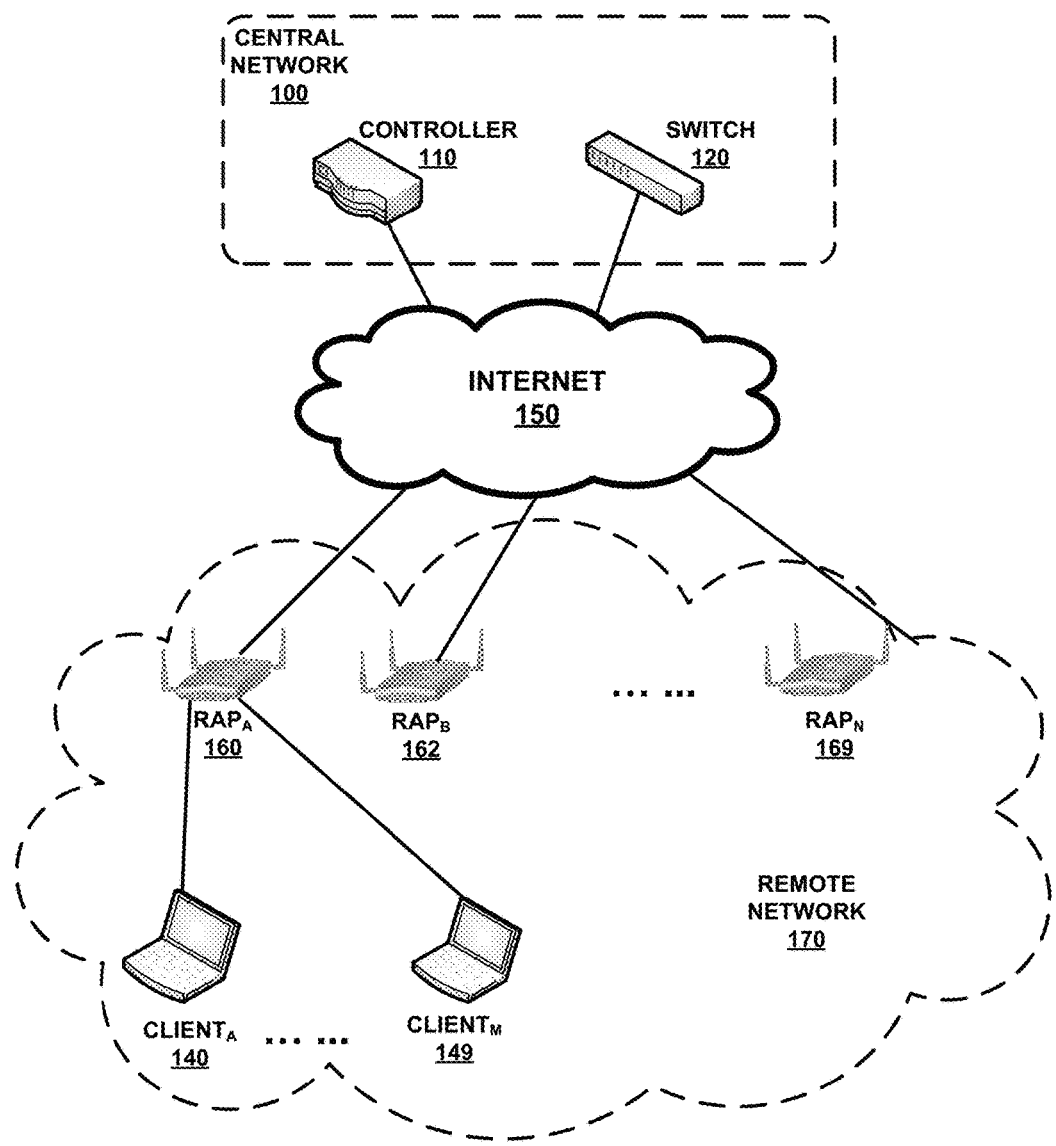

FIG. 1B shows an exemplary network environment according to embodiments of the present disclosure. Specifically, FIG. 1B includes at least a central network 100, Internet 150, and a remote network 170. Central network 100 further includes at least a switch 120, a network controller 110, and a plurality of network devices, such as access points, serving a plurality of client devices as shown in FIG. 1A. Furthermore, remote network 170 includes a plurality of remote access points, such as, RAP$_A$ 160, RAP$_B$ 162, ..., RAP$_N$ 169. Also, multiple client devices are associated with each remote access point. For example, Client$_A$ 140 to Client$_M$ 149 are associated with RAP$_A$ 160 in the example illustrated in FIG. 1B.

Each remote access point (RAP) connects to a network controller in central network 100 through a secure communication channel. Also, each RAP serves one or more client devices in remote network 170. Each client device and/or RAP may connect to another network device and/or client device via a secure communication channel, such as an IPSec tunnel. For example, Client$_A$ 140 may establish an IPSec tunnel that terminates at controller 110 in central network 100 in FIG. 1B.

IPSec generally refers to a set of extensions to the Internet Protocol (IP) family. It provides three basic services—(1) integrity, (2) authentication and verification, and (3) confidentiality. Specifically, integrity generally refers to maintaining and assuring the accuracy and consistency of data over its entire life-cycle. Further, authentication generally refers to making sure that the data come from the correct source as identified with the data; and, verification generally refers to making sure that the data has not been altered. Moreover, confidentiality generally means that the contents are not visible to any third parties, even if the third parties have access to the data in transit.

Security Policy Database (SPD) generally specifies the policies that determine the disposition of all IP traffic inbound or outbound from a host or a security gateway. Security Association Database (SAD) generally refers to a security association table, containing parameters that are associated with each security association. The SPD must be consulted during the processing of all traffic, including both inbound traffic and outbound traffic. The traffic may include both IPSec traffic and non-IPSec traffic. The policy entries in SPD are ordered and the first matched policy will be used to process the traffic. Thus, the policy order determines the packet processing behavior.

For outbound traffic processing of traffic originated from virtual private network clients, if IPsec is desired, each outbound packet is compared against the SPD to determine what processing is required for the packet. Specifically, the system typically first match the packet's selector fields against the outbound policies in the SPD to locate the first appropriate policy. Then, the system will determine the action according to the located policy. If the policy requires the packet to be discarded, the packet will be discarded, whereas the packet information may be logged. If the policy indicates that the packet is allowed to bypass IPSec processing, the system skip the following IPsec processing, and send the packet out.

If the policy indicates that IPSec processing is required, the system will locate the appropriate Security Association (SA) generated by this policy's innermost policy content using the first-outbound-sa pointer for a certain policy. If no SA is found and Internet Key Exchange (IKE) is not activated, the system will drop the packet. Otherwise, if IKE is activated, the system will queue the packet and initiate IKE negotiation. Then, the system will use the obtained SA to perform the required IPSec processing.

In some embodiments, the packet will be queued if the IKE starts. The packet processing will be resumed when IKE finishes the negotiation and the SA is ready. In some embodiments, the first packet will be dropped, which is followed by negotiation of IKE and/or IPSec. Then, subsequent packets will be encrypted using IPSec SA. For TCP socket, the SAs used to protect the traffic will be queued in the socket pointer. The next time when the system sends the packets through this socket, no policy lookup and/or SA lookup is required unless the SA is rekeyed causing a change in the SA pointer.

Moreover, the system can iteratively determine whether there is any outer policy content. The system will further find the SA according to the outer policy content if any outer policy content exists. If no more outer policy content, the system will send the packet out.

For inbound processing of traffic destined to virtual private network clients, the following steps are taken to process IPsec inbound packet. First, when an IPSec-protected packet is received, the system will use the packet's destination address in the outer IP header, IPSec protocol, and SPI to look up the SA in the SAD. If the SA lookup fails, the system will drop the packet and report the error. Second, the system uses the SA found in the previous step to perform the IPSec processing, e.g., authentication and decryption.

Meanwhile, the system can save the SA and its order for later verification. Third, the system will process the next header, if it is an IPSec header, the system will repeat the first step; if it is another IP header the system will remove the tunnel header and process the next header again. If a transport protocol header is encountered, the system will find the incoming policy in the SPD using the inner IP header information. Next, the system checks whether the required IPSec processing has been applied, for example, by verifying that the SA's saved in the second step matches the kind and order of SA's required by the policy. If the SA verification returns no error, the system will pass the resulting packet to the transport layer or forward the packet.

The SPD can also specify what type of packets should bypass IPSec and what type of packets should be discarded. Thus, the SPD also will be consulted for incoming non-IPSec traffic. Further, the SPD entries explicitly are ordered because several entries might match a particular packet, and also because the processing must be reproducible. Therefore, the SPD acts as a packet filter where the actions decided upon are the activation of SA processes. Selectors can include, for example, source and destination addresses, port numbers, application and user identifiers, host names, security sensitivity levels, protocols, etc. An exemplary SPD entry would contain a pointer to active SAs and selector fields.

Although only one switch is shown in FIGS. 1A-1B, it shall be noted that multiple switches may exist in the network and connected to the plurality of servers and/or access points. As such the plurality of servers may be connecting different switches and belong to the same or different virtual local area networks (VLANs).

Dynamic Detection of Inactive IKE Peers

Embodiments of present disclosure provide for dynamic detection of inactive IKEv1/IKEv2 peers before their corresponding IPSec SA lifetime expires on IKEv1/IKEv2 responder without any additional informational exchange.

A. Dead Peer Detection (DPD)

Dead Peer Detection (DPD) is a mechanism that allows a network device, such as a network controller, to learn about the liveliness of an IKE peer. DPD uses IPSec traffic patterns to minimize the number of messages required to confirm the availability of an IKE peer. Moreover, DPD is used to reclaim the lost resources in case a peer is found dead; and, it is also used to perform IKE peer failover. Also, DPD is typically initiated or triggered by IKE initiators (e.g., clients), and not IKE responders (e.g., servers or VPN concentrators). This is because maintaining timers and initiating exchanges consumes resources which are quite vital on a VPN concentrator or a Remote Access Server.

Note that, the DPD configurations, such as DPD interval, DPD retry interval, and number of DPD retires, are specific to each client and/or access point. A network control device will need to observe network communication patterns between IKE peers in order to derive the DPD configuration parameters for each IKE peer.

B. Expected Timeout Period

To detect an inactive client or access point at runtime, a network device can leverage information gathered from informational DPD communication exchanges, and determine values of a set of parameters, such as, a DPD interval, a DPD retry interval, and number of DPD retries. The network device can then dynamically determine a timeout value corresponding to a particular client based on the determined values of the parameters. For example, if the responder does not receive a DPD packet from an IKE peer for an expected timeout period, the network device will assume that the IKE peer is dead, and will clear the session locally without doing any DELETE informational exchange with IKE peer.

In some embodiments, the expected period of time is determined as the following:

EXPECTED_TIMEOUT_PERIOD=DPD_INTERVAL+
(DPD_RETRY_INTERVAL*DPD_RETRIES)

Specifically, EXPECTED_TIMEOUT_PERIOD indicates the period of time that the network device waits before presuming that the IKE peer (e.g., a client device, or an access point) is dead. DPD_INTERVAL indicates an interval period at which an IKE peer sends a DPD message to notify the network device that the corresponding client device or access point is alive. DPD_RETRY_INTERVAL indicates a period of time within which, if no acknowledgement is received, the IKE peer will resend the DPD message. DPD_RETRIES indicates the number of times that the IKE peer will continue resending the DPD message if no acknowledgement is received.

C. Periodic DPD Scheme

Figure 2A:
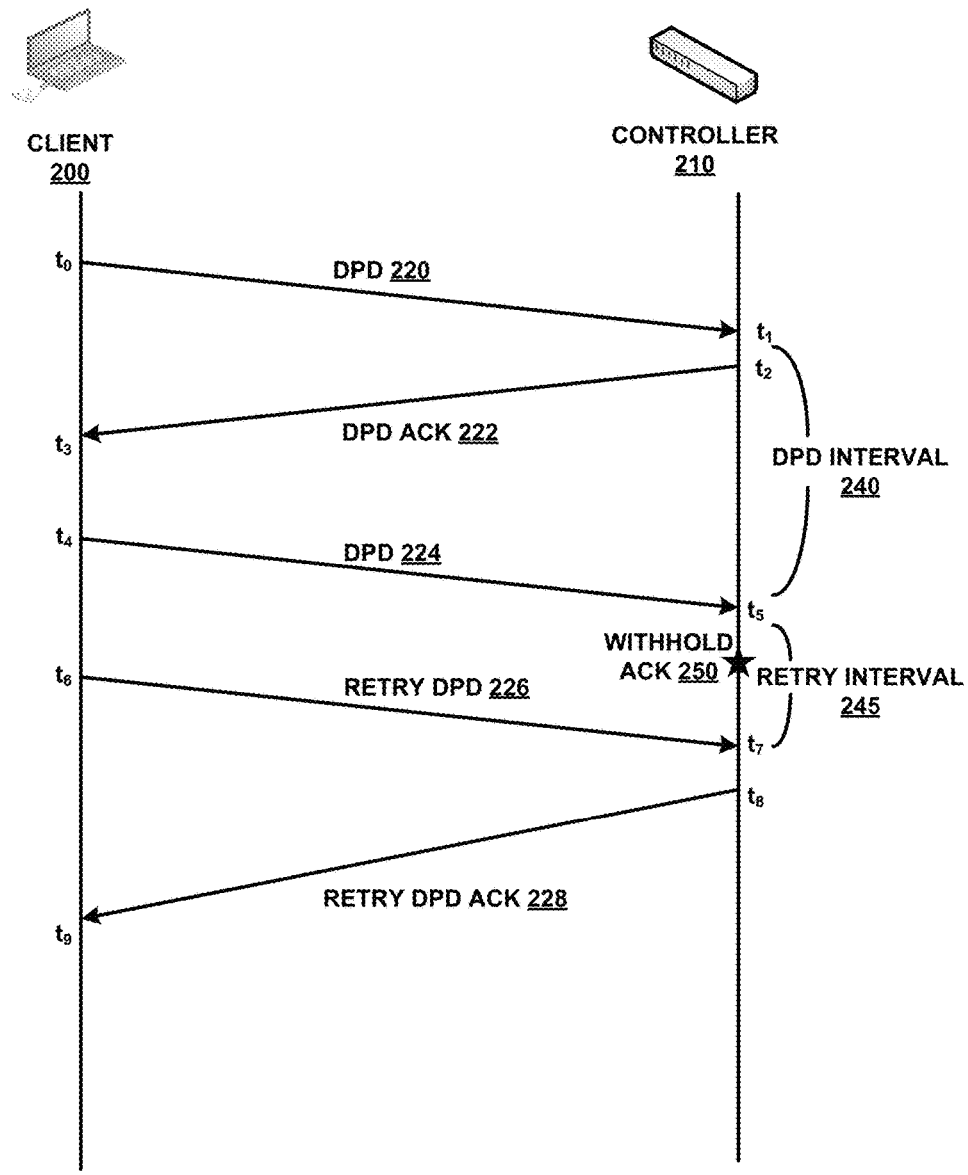
FIGS. 2A-2B show exemplary communication exchanges in a periodic Dead Peer Detection (DPD) scheme according to embodiments of the present disclosure.
Figure 2B:
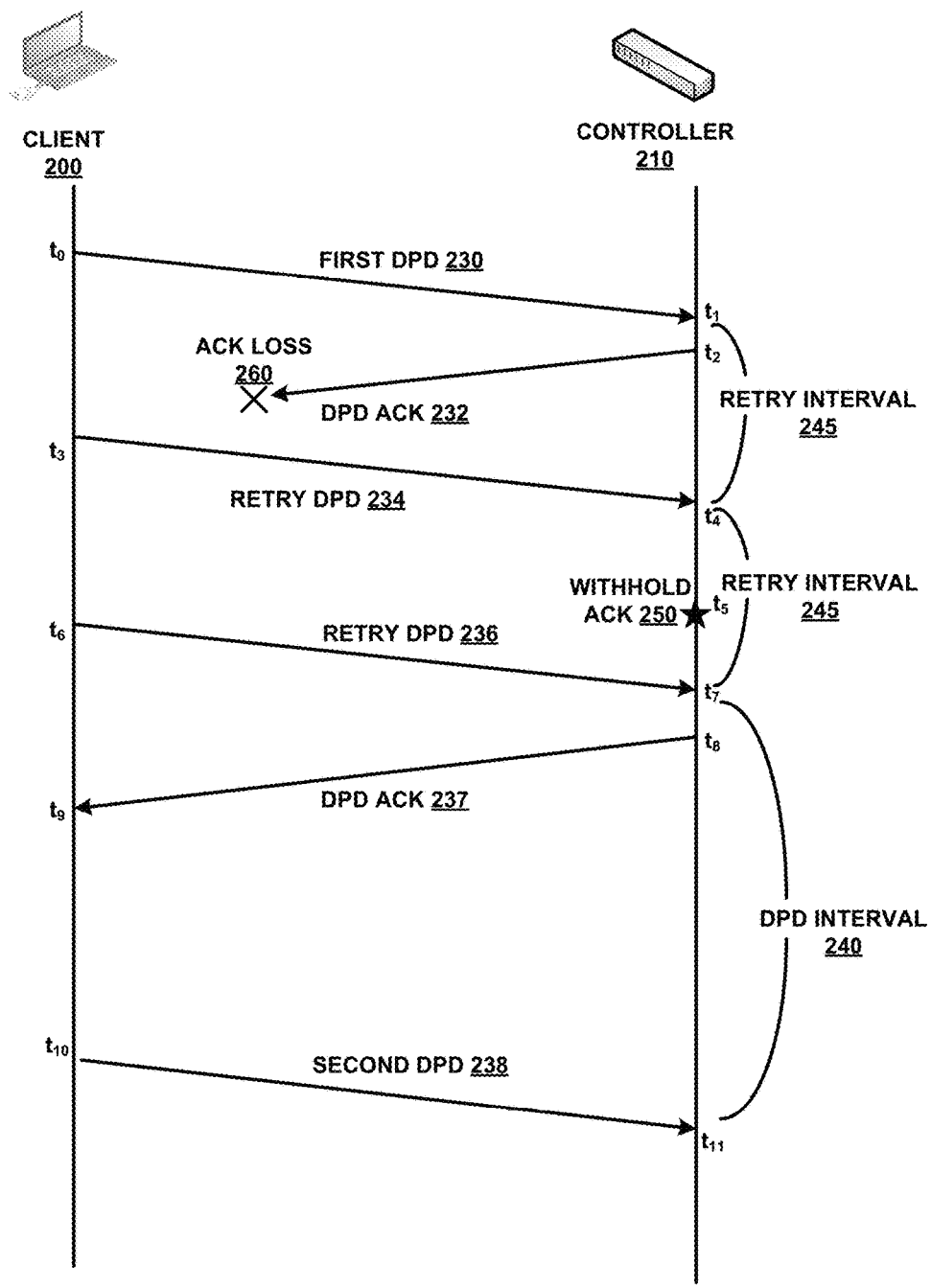

In general, there are two DPD schemes, namely, periodic DPD scheme and on-demand DPD scheme. FIGS. 2A-2B illustrate an exemplary periodic DPD scheme according to embodiments of the present disclosure. Specifically, FIG. 2A includes a client 200 and a controller 210. When client device 200 is configured with a periodic DPD scheme, client device 200 will send a DPD message, such as DPD 200 or DPD 204, at a predetermined fixed interval. Note that, according to the periodic DPD scheme, client device 200 will send DPD irrespective of the existence or absence of data traffic between client device 200 and other devices in the network.

As illustrated in FIG. 2A, initially at time point $t_0$, client device 200 transmits a first DPD message 220, which is received by a network controller 210 at time point $t_1$. Upon receipt of the DPD message 220, network controller 210 immediately transmits a DPD ACK message 222 at time point $t_2$ to confirm the receipt of the first DPD message 220. DPD ACK message 222 is received by client device 200 at time point $t_3$. Subsequently, client device 200 sends a second DPD message 224 at time point $t_4$ to network controller 210 after a predetermined and fixed interval period of time. The second DPD message 224 is received by network controller 210 at time point $t_5$. Therefore, network controller 210 can determine DPD interval 240 based on a difference in time between time point $t_4$ (when the second DPD message 224 is received) and time point $t_1$ (when the first DPD message 220 is received).

Upon receiving the second DPD message 224, network controller 210 will withhold DPD ACK message 250. Thus, client device 200 will not receive any DPD ACK message from network controller 210 in response to its second DPD message 224. As a result, client device 200 will transmit a retry DPD message 226 at time point $t_6$. Retry DPD message 226 generally has the same information as the second DPD message 224, except that retry DPD message 226 will increase the sequence number within the DPD message by one. Each original DPD message, such as the first DPD message 220 and the second DPD message 224, includes a sequence number. The sequence number is incremented by 1 for every DPD packet, including normal DPD message and/or retry DPD message. Retry DPD message 226 is received by network controller at time point $t_7$. Therefore, network controller 210 can determine DPD retry interval 245 based on a difference in time between time point $t_7$ (when retry DPD message 226 is received) and time point $t_5$ (when corresponding DPD message 224 is received). Thereafter, network controller 210 will transmit a retry DPD ACK message 228 at time point $t_8$ to confirm the receipt of retry DPD message 226. At time point $t_9$, client device 200 receives retry DPD ACK message 228.

Note that, network controller 210 can dynamically learn whether a received second DPD message is a normal DPD message or a retry of the initial DPD message by withholding acknowledgement frame ACK 250. If a first time interval between the receipt of the second DPD message and the receipt of first DPD message (e.g., $t_5-t_1$) does not equal to a second time interval between the receipt of the third DPD message and the receipt of second DPD message (e.g., $t_7-t_5$), then the first time interval is determined to be DPD interval 240 and the second time interval is determined to be retry interval 245. On the other hand, if the first time interval equals to the second time interval, then the first/second time interval is determined to be the retry interval and the calculation of DPD interval will be based on additionally received DPD message as described below with regard to FIG. 2B.

As for the number of DPD retries, network controller 210 will initially presume a default value of 5 retries per DPD message. Based on real-time traffic or data rate from a particular IKE peer, the number of retries can be modulated between a predetermined minimum number and a predetermined maximum number. For example, "show datapath tunnel" may return information regarding data traffic on that IPSec SA. If the data rate is high, the number of retries will be set high. On the other hand, if the date rate is low, the number of retries will be set low. In some embodiments, the choice can be left to the user to configure the number of DPD retries. For example, the user may be interested in a particular client device even though the data rate corresponding to the particular client device is low, but the particular client device is important for other reasons. In such cases, the number of retries can be configured to a specific value, and dynamic adjustment of the number of retries may not be applicable.

Based on the DPD interval 240 (T), DPD retry interval 245 (t), and number of retries (n) determined above, network controller 210 can calculate an expected timeout value (N=T+n*t) for client device 200. Moreover, network controller 210 starts a timer, which is configured with the expected timeout value, upon transmitting the retry DPD ACK message 228 at time point $t_8$. Upon expiration of the timer, network controller 210 will declare client device 200 as inactive.

FIG. 2B illustrates another use case scenario in an exemplary periodic DPD scheme according to embodiments of the present disclosure. Specifically, FIG. 2B includes a client 200 and a network controller 210. Similar to the scheme described in FIG. 2A, when client device 200 is configured with a periodic DPD scheme, client device 200 will send a DPD message, such as DPD 200 or DPD 204, at a predetermined fixed interval irrespective of the data traffic between client device 200 and controller 210.

As illustrated in FIG. 2B, initially at time point $t_0$, client device 200 transmits a first DPD message 230, which is received by a network controller 210 at time point $t_1$. Upon receipt of the DPD message 230, network controller 210 immediately transmits a DPD ACK message 232 at time point $t_2$ to confirm the receipt of the first DPD message 220. Unlike in FIG. 2A, DPD ACK message 222 is not received by client device 200, for example, due to packet loss 260. Thus, client device 200 will transmit a retry DPD message 234 at time point $t_3$. Retry DPD message 234 generally has the same information as the first DPD message 230, except that retry DPD message 234 will increase the sequence number within the first DPD message 230 by one. Retry DPD message 234 is received by network controller 210 at time point $t_4$. Therefore, network controller 210 can determine DPD retry interval 245 based on a difference in time between time point $t_4$ (when retry DPD message 234 is received) and time point $t_1$ (when the first DPD message 230 is received).

Thereafter, upon receiving the retry DPD message 234, network controller 210 will withhold DPD ACK message 250 at time point $t_5$. Thus, client device 200 will not receive any DPD ACK message from network controller 210 in response to its retry DPD message 234. As a result, client device 200 will transmit a second retry DPD message 236 at time point $t_6$. The second retry DPD message 236 generally has the same information as the first DPD message 230, except that the second retry DPD message 236 will increase the sequence number within the DPD message by two. Each DPD message, such as the first DPD message 220 and the second DPD message 224, includes a sequence number. The sequence number is incremented by 1 for every DPD packet, including normal DPD message and/or retry DPD message.

Note that, network controller 210 can dynamically learn whether a received second DPD message, such as retry DPD message 234, is a normal DPD message or a retry of the initial DPD message by withholding acknowledgement frame ACK 250. If a first time interval between the receipt of the second DPD message and the receipt of first DPD message (e.g., $t_5-t_1$) equals to a second time interval between the receipt of the third DPD message and the receipt of second DPD message (e.g., $t_7-t_5$), then the first/second time interval is determined to be the retry interval and the calculation of DPD interval will be based on additionally received DPD message, such as second DPD message 238.

Retry DPD message 236 is received by network controller at time point $t_7$. Therefore, network controller 210 can determine DPD retry interval 245 based on a difference in time between time point $t_7$ (when second retry DPD message 236 is received) and time point $t_4$ (when first retry DPD message 234 is received). Thereafter, network controller 210 will transmit a retry DPD ACK message 237 at time point $t_8$ to confirm the receipt of the second retry DPD message 236. At time point $t_9$, client device 200 receives retry DPD ACK message 237.

Subsequently, client device 200 sends a second DPD message 238 at time point $t_{10}$ to network controller 210 after a predetermined and fixed interval period of time. The second DPD message 238 is received by network controller 210 at time point $t_{11}$. Therefore, network controller 210 can determine DPD interval 240 based on a difference in time between time point $t_{11}$ (when the second DPD message 238 is received) and time point $t_7$ (when the previous retry DPD message 237 is received).

Based on the DPD interval 240 (T), DPD retry interval 245 (t), and number of retries (n) determined above, network controller 210 can calculate an expected timeout value (N=T+n*t) for client device 200. Moreover, network controller 210 starts a timer, which is configured with the expected timeout value, upon transmitting the DPD ACK message confirming receipt of the second DPD message 238. Upon expiration of the timer, network controller 210 will declare client device 200 as inactive.

D. On-Demand DPD Scheme

Figure 3:
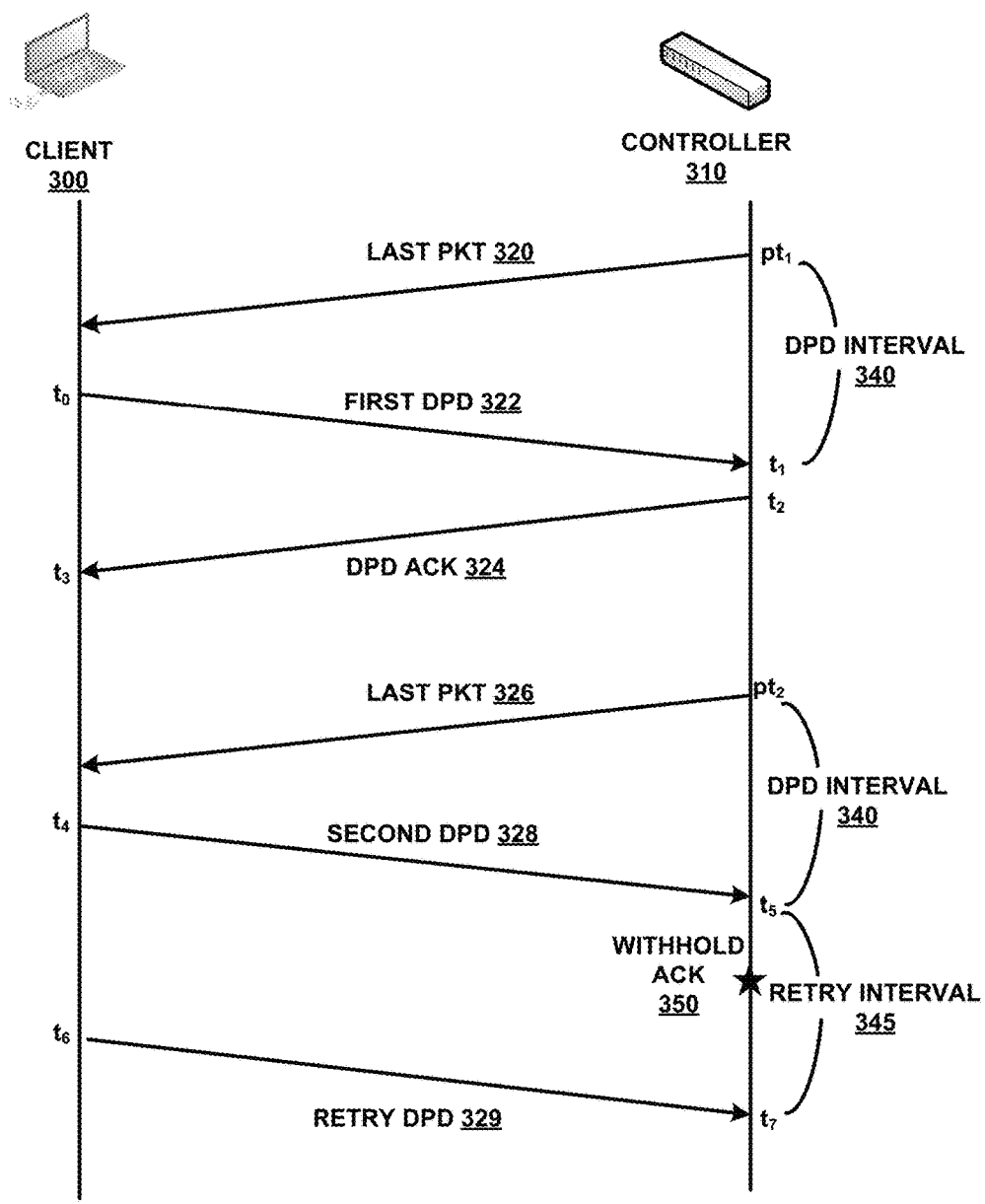
FIG. 3 shows an exemplary communication exchanges in an on-demand DPD scheme according to embodiments of the present disclosure.

FIG. 3 illustrates an exemplary on-demand DPD scheme according to embodiments of the present disclosure. Specifically, FIG. 3 includes a client device 300 and a network controller 310. When client device 300 is configured with an on-demand DPD scheme, client device 300 will send a DPD message only if client device 300 has not received any traffic from network controller 310 for a predetermined period of time (e.g., DPD interval). For example, client device 300 may keep track of the time point ($t_{last}$) when the last inbound data packet and/or DPD acknowledgment packet is received, and starts a timer configured with a predetermined DPD interval value. If prior to the timer expires, a new inbound data packet or DPD ACK packet is received from network controller 310, client device 300 will update the time point ($t_{last}$) with the time point when the new inbound data packet or DPD ACK packet is received. Client device 300 will also reset the timer. Likewise, network controller 310 keeps track of the time point (pt) when the last data packet is sent to client device 300, and calculate the expected timeout value based on the difference in time between pt (last packet sent out on outbound SPI) and the time point when first DPD packet received over the IKE.

Specifically, FIG. 3 includes client device 300 and network controller 310. At time point $pt_1$, last data packet 320 was transmitted from network controller 310 to client device 300. At time point $t_0$, client device 300 transmits a first DPD message 322 to network controller 310. The first DPD message 322 is received by network controller 310 at time point $t_1$. Thereafter, network controller 310 immediately transmits a DPD ACK message 324 at time point $t_2$ to confirm the receipt of first DPD message 322. DPD ACK message 324 may or may not be received by client device 300.

Subsequently, client device 300 and network controller 310 continue data communications with each other. During these data communications, network controller 310 continues to update pt with the time point when the last packet 326 was sent to client device 300. For illustration purposes only, assuming that after last packet 326 was transmitted from network controller 310 at $pt_2$ and received by client device 300, client device 300 transmits a second DPD message 328 at time point $t_4$. The second DPD message 328 is received by network controller 310 at time point $t_5$. Note that, if DPD ACK message 324 is successfully received by client device 300, $pt_2$ will not equal to $pt_1$. Thus, network controller 310 can determine whether client device 300 has received DPD ACK message 324 by comparing the values of $pt_1$ and $pt_2$.

Assuming that network controller 310 determines that $pt_1$ equals to $pt_2$, and infers that DPD ACK message 324 is not received by client device 300. Because without receiving DPD ACK message 324, client device 300 would be sending a retry of the first DPD message 322. Thus, network controller 310 will determine the time point $t_x$ (not shown) when the next DPD message is received after first DPD message 322. Then, network controller 310 can calculate retry interval based on a time in difference between time point $t_x$ (when the next DPD message is received after first DPD message 322) and time point $t_1$ (when the first DPD message 322 is received). Subsequently, network controller 310 will send a DPD ACK message corresponding to the retry DPD message. To determine the DPD interval, network controller 310 determines a time point $t_5$ when a second DPD message 328 is received, as well as a time point $pt_2$ when the last outbound data packet is sent. Then, network controller 310 can calculate DPD interval 340 based on a time in difference between time point $t_5$ (when second DPD message 328 is received) and time point $pt_2$ (when last outbound data packet is sent).

Now, assuming that DPD ACK message 324 is successfully received by client device 300 at time point $t_3$. Here, network controller 310 calculates a first difference in time between when the first DPD message 322 is received from client device 300 and when the last packet is sent to client device 300, i.e., ($t_1-pt_1$). Then, network controller 310 calculates a second difference in time between when the second DPD message 328 is received from client device 300 and when the last packet is sent to client device 300, i.e., ($t_5-pt_2$). Next, network controller 310 compares the first difference in time with the second difference in time. If they are the same, network controller 310 will determine that client device 300 is configured with an on-demand DPD scheme. Otherwise, network controller 310 will determine that client device 300 is configured with a periodic DPD scheme.

If network controller 310 determines that client device 300 is configured with a periodic DPD scheme, network controller 310 will use methods described above regarding FIGS. 2A-2B to determine the expected timeout value for the client device. On the other hand, if network controller 310 determines that client device 300 is configured with an on-demand DPD scheme, network controller 310 will determine DPD interval 340 based on the difference in time between when the DPD message is received and when the last packet is sent.

Moreover, after receiving the second DPD message 328 at time point t5, network controller 310 will withhold DPD ACK 350. As a result, because client device 300 will not receive any DPD ACK messages, client device 300 will be sending, at time point $t_6$, a retry DPD message 329 corresponding to the second DPD message 328. Retry DPD message 329 is received at network controller 310 at time point t7. Then, network controller 310 can determine a DPD retry interval 345 based on a difference in time between time point $t_7$ (when retry DPD message 329 is received) and time point $t_5$ (when the second DPD message 328 is received). The determination of the number of retries and the calculation of expected timeout value are the same in both the periodic DPD scheme and the on-demand DPD scheme.

E. Usage and Benefits

For a Virtual Intranet Access (VIA)™ client that connects to a corporate network via a hybrid IPSec/SSL VPN, a user of the client device often merely closes the laptop without actually disconnecting VIA client. However, the transport layer connectivity of the laptop is lost due to, for example, user disconnecting LAN cable, user roaming outside WLAN coverage area, or the laptop being in a hibernate mode, etc. In such cases, the network controller will detect the inactivity of VPN client, and delete the IPSec tunnel proactively. Thereby, the system can free resources on the network controller and/or access points that the client is connected to. Because the resources on a Remote Access Server are very crucial, the technology described herein allows the Remote Access Server to stretch its limitations.

Moreover, embodiments of the present disclosure use IKE identity rather than IP address as basis for client identification. The IKE identity does not change even when a client device roams from one access point to associate with another access point in the network. Further, when multiple client devices are located behind a firewall, these client devices may appear to have the same IP address to a device located outside the firewall. Nonetheless, each client device will have a unique IKE identity. Therefore, a customized timeout value will be dynamically determined for each client device even when the client devices are located behind a common firewall.

In addition, the dynamic determination of timeout value descried in the present disclosure can be applied to communication exchanges between access points and network controllers. Similar to DPD messages, when an access point (AP) connects to a network controller, the AP and the network controller complete a handshake protocol followed by a periodic heartbeat exchange. Thus, the controller can determine whether an AP is inactive based on observed patterns of the period heartbeat exchange with the AP.

Process for Dynamic Detection of Inactive VPN Clients

Figure 4A:
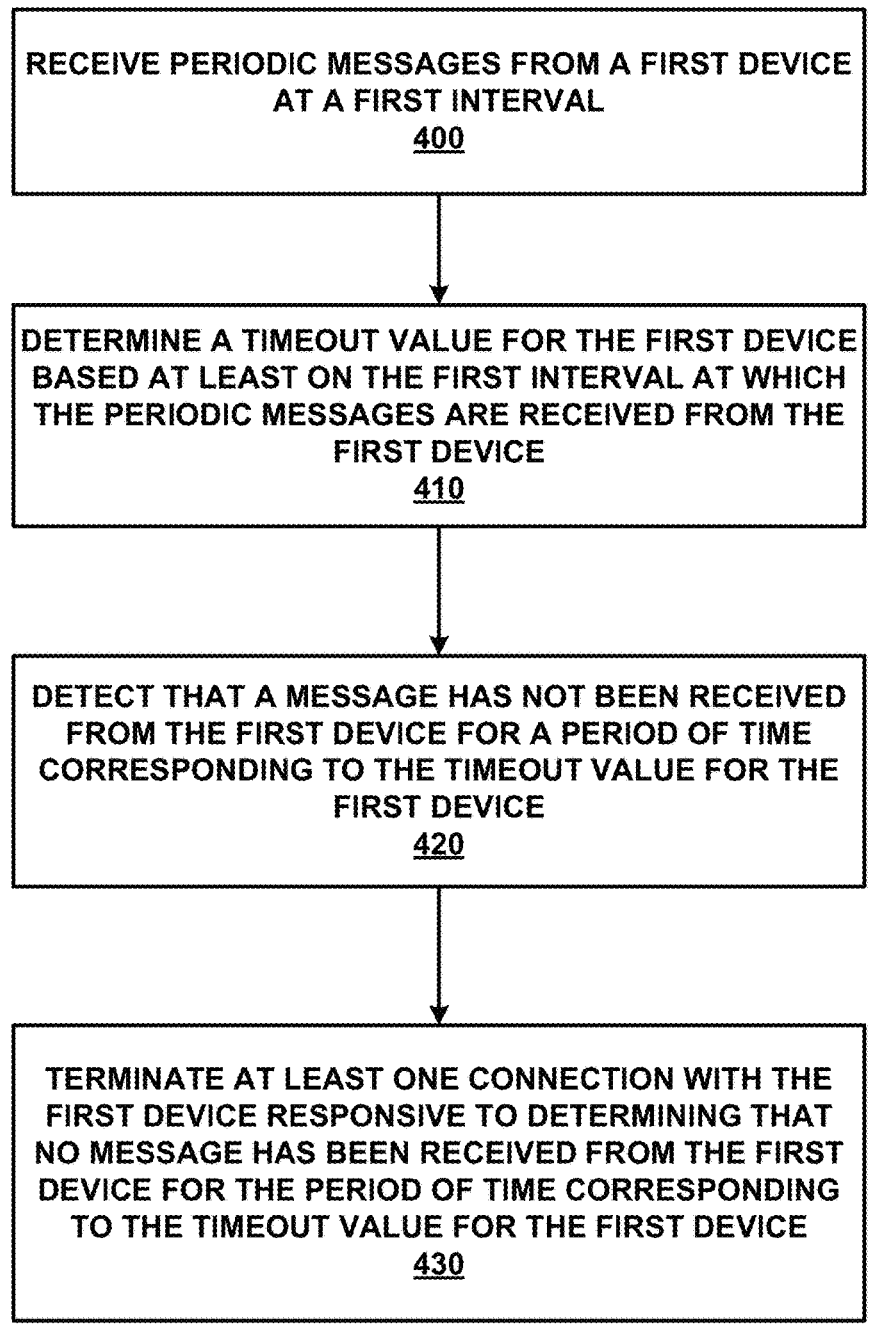
FIGS. 4A-4B illustrate exemplary processes for dynamic detection of inactive virtual private network clients according to embodiments of the present disclosure.

FIG. 4A illustrates an exemplary process for dynamic detection of inactive VPN clients according to embodiments of the present disclosure. During operations, a network device receives periodic messages from a first device at a first interval (operation 400). The network device then determines a timeout value for the first device based at least on the first interval at which the periodic messages are received from the first device (operation 410). Subsequent to determining the timeout value, the network device detects that a message has not been received from the first device for a period of time corresponding to the timeout value for the first device (operation 420). Furthermore, the network device terminates at least one connection with the first device responsive to determining that no message has been received from the first device for the period of time corresponding to the timeout value for the first device (operation 430).

In some embodiments, the network device also receives periodic messages from a second device at a second interval, which is different from the first interval. The network device then determines a timeout value for the second device based at least on the second interval at which the periodic messages are received from the second device. Note that, the timeout value for the second device is different than the timeout value for the first device. Subsequent to determining the timeout value for the second device, the network device detects that a message has not been received from the second device for a period of time corresponding to the timeout value for the second device. The network device then terminates at least one connection with the second device responsive to determining that no message has been received from the second device for the period of time corresponding to the timeout value for the second device. Note that, the second device is different from the first device. Therefore, different devices may be associated with different timeout values according to these embodiments.

In some embodiments, the network device determines the timeout value for the first device based on a time of period estimated for at least one retry message. Specifically, the network device can refrain from acknowledging a particular periodic message of the periodic messages received from the first device, and estimate the time of period for the at least one retry message as a difference between (a) receipt of the particular periodic message and (b) receipt of a retry message subsequent to the particular periodic message.

In some embodiments, determining the timeout value for the first device is further based on a time of period estimated for a particular number of retry messages. Here, the particular number of retry messages is dynamically determined based on a data pattern detected for the first device.

In some embodiments, the periodic messages are transmitted by the first device to indicate that the first device is still connected to one or more network resources. For example, the periodic messages can be transmitted by an IKE peer to indicate that the client device albeit inactive is still alive. In some embodiments, the periodic messages are transmitted by the first device to prevent a timeout of a session associated with the first device. More specifically, the periodic messages can be either a Dead Peer Detection (DPD) message and/or a heartbeat message.

In some embodiments, the network device terminates at least one connection with the first device by deleting a session record associated with the first device. In some embodiment, the network device determines the timeout value by modifying a previously determined timeout value. For example, the initial timeout value may be configured as a predetermined static value. Nevertheless, the network device can modify the initial timeout value dynamically according to embodiments of the present disclosure.

Figure 4B:
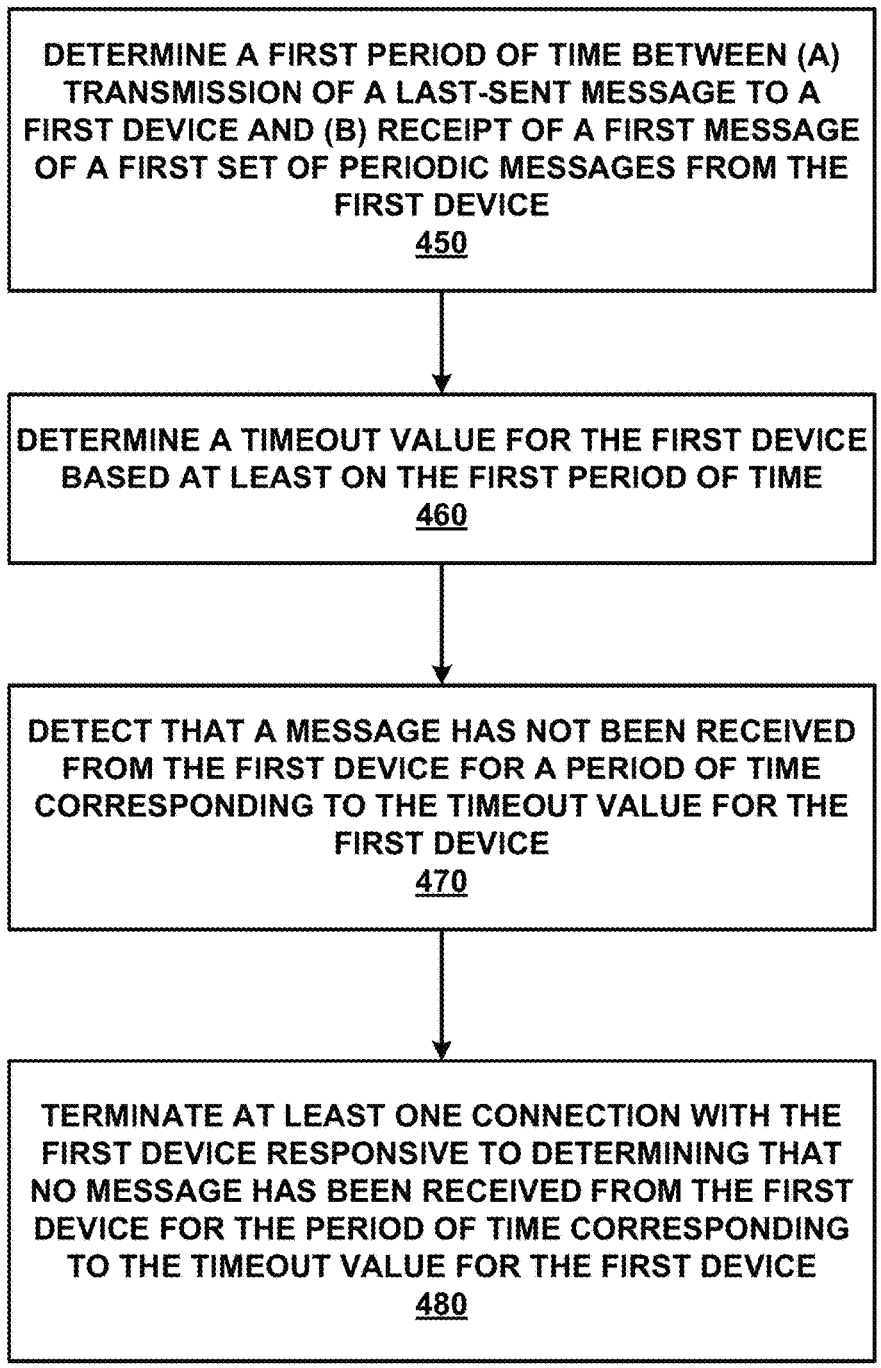

FIG. 4B illustrates another exemplary process for dynamic detection of inactive VPN clients according to embodiments of the present disclosure. During operations, a network device determines a first period of time between (a) transmission of a last-sent message to a first device and (b) receipt of a first message of a first set of periodic messages from the first device (operation 450). The network device also determines a timeout value for the first device based at least on the first interval at which the periodic messages are received from the first device (operation 460). Subsequent to determining the timeout value, the network device detects that a message has not been received from the first device for a period of time corresponding to the timeout value for the first device (operation 470). Furthermore, the network device terminates at least one connection with the first device responsive to determining that no message has been received from the first device for the period of time corresponding to the timeout value for the first device (operation 480). In some embodiments, the last-sent message is a last-sent data message.

In some embodiments, the network device also determines a second period of time between (a) transmission of a last-sent message to the first device and (b) receipt of a first message of a second set of periodic messages from the first device. Furthermore, the network device determines the timeout value for the first device based at least on the first period of time if the first period of time is approximately equal to the second period of time. The first period of time is considered "approximately equal to" the second period of time if the first period of time and the second period of time are within a threshold range of each other.

In some embodiments, the network device determines the timeout value for the first device based on a time of period estimated for at least one retry message. In some embodiments, the network device determines the timeout value for the first device based on a time of period estimated for a particular number of retry messages. The particular number of retry messages can be dynamically determined based on a data pattern detected for the first device.

The network device may terminate at least one connection with the first device by deleting a session record associated with the first device. Also, the network device may determine the timeout value comprises modifying a previously determined timeout value.

In some embodiments, the set of periodic messages are transmitted by the first device to indicate that the first device is still connected to one or more network resources. In some embodiments, the set of periodic messages are transmitted by the first device to prevent a timeout of a session associated with the first device. The set of periodic messages can be one of a Dead Peer Detection (DPD) message, a heartbeat message, etc.

System for Dynamic Detection of Inactive VPN Clients

Figure 5:
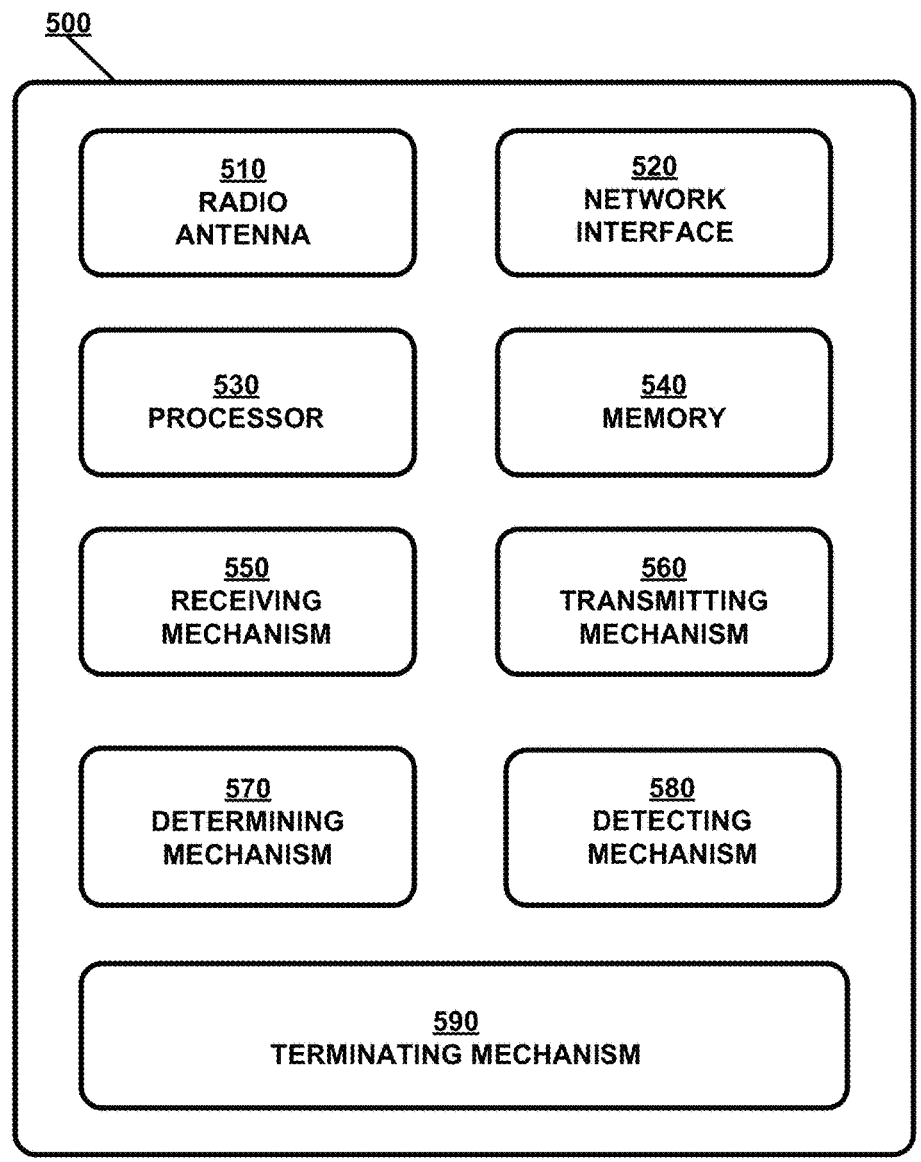
FIG. 5 is a block diagram illustrating an exemplary system for dynamic detection of inactive virtual private network clients according to embodiments of the present disclosure.

FIG. 5 is a block diagram illustrating a system for dynamic detection of inactive VPN clients according to embodiments of the present disclosure.

Network device 500 includes at least one or more radio antennas 510 capable of either transmitting or receiving radio signals or both, a network interface 520 capable of communicating to a wired or wireless network, a processor 530 capable of processing computing instructions, and a memory 540 capable of storing instructions and data. Moreover, network device 500 further includes an receiving mechanism 550, a transmitting mechanism 560, a determining mechanism 570, a detecting mechanism 580, and a terminating mechanism 590, all of which are in communication with processor 530 and/or memory 540 in network device 500. Network device 500 may be used as a client system, or a server system, or may serve both as a client and a server in a distributed or a cloud computing environment.

Radio antenna 510 may be any combination of known or conventional electrical components for receipt of signaling, including but not limited to, transistors, capacitors, resistors, multiplexers, wiring, registers, diodes or any other electrical components known or later become known.

Network interface 520 can be any communication interface, which includes but is not limited to, a modem, token ring interface, Ethernet interface, wireless IEEE 802.11 interface, cellular wireless interface, satellite transmission interface, or any other interface for coupling network devices.

Processor 530 can include one or more microprocessors and/or network processors. Memory 540 can include storage components, such as, Dynamic Random Access Memory (DRAM), Static Random Access Memory (SRAM), etc.

Receiving mechanism 550 generally receives one or more network messages via network interface 520 or radio antenna 510 from a wireless client. The received network messages may include, but are not limited to, requests and/or responses, beacon frames, management frames, control path frames, and so on. In particular, receiving mechanism 550 can receive periodic messages from a first device at a first interval. The periodic messages are transmitted by the first device to indicate that the first device is still connected to one or more network resources. For example, the periodic messages can be transmitted by an IKE peer to indicate that the client device albeit inactive is still alive. In some embodiments, the periodic messages are transmitted by the first device to prevent a timeout of a session associated with the first device. More specifically, the periodic messages can be either a Dead Peer Detection (DPD) message and/or a heartbeat message.

Transmitting mechanism 560 generally transmits messages, which include, but are not limited to, requests and/or responses, beacon frames, management frames, control path frames, and so on. In particular, transmitting mechanism 560 can transmit a DPD ACK message to acknowledge or confirm the receipt of a corresponding DPD message. In some embodiments, transmitting mechanism 560 can refrain from acknowledging a particular periodic message of the periodic messages received from the first device and cause a retry message to be transmitted, and thus allows for estimating the time of period for the at least one retry message as a difference in time between (a) the receipt of a particular periodic message and (b) the receipt of a retry message subsequent to the particular periodic message.

Determining mechanism 570 generally determines timeout values for devices based on observed traffic patterns. Specifically, determining mechanism 570 determines a timeout value for the first device based at least on the first interval at which the periodic messages are received from the first device. In some embodiments, determining mechanism 570 determines a first period of time between (a) transmission of a last-sent message to a first device and (b) receipt of a first message of a first set of periodic messages from the first device.

In some embodiments, determining mechanism 570 determines the timeout value for the first device based on a time of period estimated for a particular number of retry messages. The particular number of retry messages is dynamically determined based on a data pattern detected for the first device. In some embodiment, determining mechanism 570 determines the timeout value by modifying a previously determined timeout value.

Detecting mechanism 580 generally detects that a message has not been received from a device for a period of time corresponding to the timeout value for this device.

Terminating mechanism 590 generally terminates connection from a device after detecting mechanism 580 detects that no message has been received from the device for the period of time corresponding to the timeout value. In some embodiments, terminating mechanism 590 terminates at least one connection with the first device by deleting a session record associated with the first device.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions executable by a processor to:
   determine a timeout value for a first device;
   receive a periodic message from the first device at a first interval;
   modify the timeout value for the first device based at least on the first interval, a number of retry messages receivable during a second interval, and the second interval such that the timeout value is modified to be a sum of a first factor and a second factor, wherein the first factor is a value of the first interval and the second factor is equal to a product of a value of the second interval and the number of retry messages received during the second interval;
   determine that the first device is inactive responsive to detecting that a message has not been received from the first device for a period of time corresponding to the modified timeout value for the first device; and
   terminate at least one connection with the first device determined to be inactive.

2. The medium of claim 1, further comprising instructions to:
   determine a second timeout value for a second device;
   receive periodic messages from the second device at a third interval;
   modify the second timeout value for the second device based at least on the third interval;
   detect that a message has not been received from the second device for a period of time corresponding to the modified timeout value for the second device; and
   terminate at least one connection with the second device responsive to determining that no message has been received from the second device for the period of time corresponding to the modified timeout value for the second device.

3. The medium of claim 1, further comprising instructions to:
   refrain from acknowledging a particular periodic message of the periodic message received from the first device; and
   estimate a time period for the at least one retry message as a difference in time between a receipt of the particular periodic message and a receipt of the retry message subsequent to the particular periodic message.

4. The medium of claim 1, wherein the number of retry messages is dynamically determined based on a data pattern detected for the first device.

5. The medium of claim 1, wherein the message is transmitted by the first device to indicate that the first device is still connected to one or more network resources.

6. The medium of claim 1, wherein the periodic message is transmitted by the first device to prevent a timeout of a session associated with the first device.

7. The medium of claim 1, wherein the periodic message is of a Dead Peer Detection (DPD) message type and/or a heartbeat message type.

8. The medium of claim 1, further comprising instructions to delete a session record associated with the first device to terminate at least one connection with the first device.

9. The medium of claim 1, wherein the modified timeout value is equal to the first interval when the retry message is not received.

10. The medium of claim 1, wherein the second interval is multiplied by the number of retry messages to obtain a particular value, and wherein the modified time out value is equal to a sum of the first interval and the particular value.

11. A non-transitory computer readable medium comprising instructions executable by a processor to:
   determine a first period of time between a transmission of a last-sent message to a first device and a receipt of a first message of a first set of periodic messages from the first device;
   determine a second period of time at which a retry message is received from the first device;
   subsequent to determining an quantity of time of the first period of time and the second period of time, modify a timeout value previously determined for the first device based on the first period of time, the second period of time, and a number of retry messages received from the first device during the second period of time such that the timeout value is modified to be a sum of a first factor and a second factor, wherein the first factor is a value of the first interval and the second factor is equal to a product of a value of the second interval and the number of retry messages received during the second interval;

subsequent to modifying the previously determined timeout value, detect that a message has not been received from the first device for a period of time corresponding to the modified timeout value for the first device, and terminate at least one connection with the first device responsive to determining that no message has been received from the first device for the period of time corresponding to the modified timeout value for the first device.

12. The medium of claim 11, wherein the last-sent message is a last-sent data message.

13. The medium of claim 11, further comprising instructions to:

determine another period of time between a transmission of a last-sent message to the first device and a receipt of a first message of another set of periodic messages from the first device; and modify the previously determined timeout value for the first device based on the first period of time responsive to a determination that the first period of time is approximately equal to the another period of time.

14. The medium of claim 11, further comprising instructions to dynamically determine a threshold of retry messages based on a data pattern detected for the first device, wherein at least one connection with the first device is terminated when the number of retry messages received during the second period of time reaches the threshold number of retry messages.

15. The medium of claim 14, wherein the threshold number of retry messages are modulated between a first predetermined number and a second predetermined number, and wherein the second predetermined number is greater than the first predetermined number.

16. The medium of claim 11, further comprising instructions to delete a session record associated with the first device to terminate at least one connection with the first device.

17. The medium of claim 11, wherein the set of periodic messages are transmitted by the first device to indicate that the first device is still connected to one or more network resources.

18. The medium of claim 11, wherein the set of periodic messages are transmitted by the first device to prevent a timeout of a session associated with the first device.

19. The medium of claim 11, wherein the set of periodic message are of a Dead Peer Detection (DPD) message type and/or heartbeat message type.

20. The medium of claim 11, wherein the modified timeout value is equal to a sum of the first period of time and the second period of time when a single retry message is received during the second period of time.

* * * * *